United States Patent [19]

Lu

[11] 4,275,185

[45] Jun. 23, 1981

[54] POLYIMIDES OF BISMALEIMIDES AND ACTIVATED METHYLENE COMPOUNDS

[75] Inventor: Robert T. Lu, Wilmington, Del.

[73] Assignee: ICI Americas Inc., Wilmington, Del.

[21] Appl. No.: 78,448

[22] Filed: Sep. 24, 1979

[51] Int. Cl.$^3$ .................. C08G 69/26; C08G 73/12
[52] U.S. Cl. .................... 528/170; 528/171; 528/174; 528/205; 528/208; 528/228; 528/321; 528/322
[58] Field of Search ............ 528/322, 321, 228, 205, 528/208, 170

[56] References Cited

U.S. PATENT DOCUMENTS

| | | | |
|---|---|---|---|
| 3,634,304 | 1/1972 | Suzuki et al. | 260/33.4 P |
| 3,928,286 | 12/1975 | Akiyama et al. | 528/322 |
| 4,076,697 | 2/1978 | Forgo et al. | 528/322 |

OTHER PUBLICATIONS

Biochemistry, vol. 5, No. 9 (9/66), pp. 2963–2971.
Journal of Organic Chemistry, vol. 26 (1961), pp. 787–789.
Polymer Preprints, vol. 13, No. 2 (8/72), pp. 924–929.

*Primary Examiner*—Harold D. Anderson
*Attorney, Agent, or Firm*—H. Jolyon Lammers

[57] ABSTRACT

Polyimide polymers of improved physical properties and thermal stability may be prepared by reacting an N,N'-bismaleimide with an activated methylene compound in a nonreactive organic solvent system. The polymers are useful in producing films, moldings, and laminates or other composites.

4 Claims, No Drawings

POLYIMIDES OF BISMALEIMIDES AND ACTIVATED METHYLENE COMPOUNDS

FIELD OF THE INVENTION

The present invention concerns polyimide polymers of an N,N'-bismaleimide and an activated methylene compound. The invention also concerns a method of preparing such polymers by reacting an N,N'-bismaleimide and an activated methylene compound in the presence of a nonreactive organic solvent system. A preferred solvent system is slightly acidic in nature.

DESCRIPTION OF THE PRIOR ART

Polyimide polymers of bismaleimides and diamines are well known in the prior art. U.S. Pat. No. 3,625,912 discloses the preparation of polyimide polymers by reacting a bismaleimide with a diamine, for example piperazine, in the presence of a polar organic solvent.

U.S. Pat. No. 3,897,393 discloses that polyimide polymers of bismaleimides and difunctional heterocyclic disecondary amines may be prepared by reacting a bismaleimide with a difunctional heterocyclic disecondary amine in a phenolic solvent for a sufficient time to form recurring imide units in the polymer.

It is also known in the art that bismaleimides will react with thiols, Polymer Preprints, ACS Div. Polym. Chem. 13 (2), 924–9 (1972), and with amino cids, Biochemistry 5 (9), 2963–71 (1966).

Additional art relating to imide polymers are U.S. Pat. No. 3,634,304 German Offenlegenschrift Nos. 1,954,878; 2,057,792; 2,113,063; 2,114,076; and 2,116,199; Japanese Pat. Nos. 37,732 (1971); 37,730 (1971); 37,734 (1971); and 37,735 (1971); Mustafa et al., Journal of Organic Chemistry 26 787 (1961); and "Polyimidothioethers" by J. V. Crivello, Polymer Preprints 13 No. 2 (1972), presented at New York ACS Meeting, Aug., 1972.

It has now been discovered that polyimide polymers of N,N'-bismaleimides and certain activated methylene compounds, prepared in the presence of a nonreactive organic solvent, have improved physical properties and/or thermal stability.

SUMMARY OF THE INVENTION

In accordance with the present invention, polyimide polymer compositions are prepared having the following general formula:

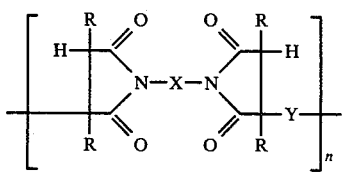

wherein X is a divalent organic radical, and wherein each R is independently selected from the group consisting of —H, —F, —Cl, —Br, —CF$_3$, and C$_{1-4}$ alkyl, Y is

wherein R$^1$ is a monovalent radical selected from the group consisting of —CN, —NO$_2$,

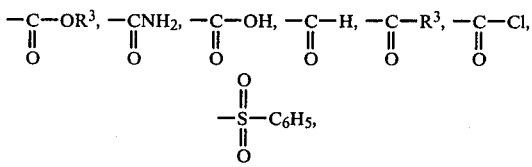

wherein R$^3$ is C$_{1-4}$ alkyl, and R$^2$ is a monovalent radical selected from the group consisting of —CN, —NO$_2$,

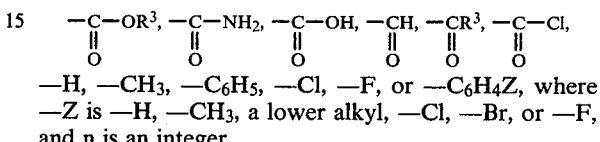

—H, —CH$_3$, —C$_6$H$_5$, —Cl, —F, or —C$_6$H$_4$Z, where —Z is —H, —CH$_3$, a lower alkyl, —Cl, —Br, or —F, and n is an integer.

These polyimide polymer compositions are prepared from N,N'-bismaleimides, which are well known in the prior art, by reacting the bismaleimide, dissolved in a suitable solvent, with certain activated methylene compounds. Each of the components which may be employed in the preparation of the polymers is described in detail below.

DESCRIPTION OF THE INVENTION

The N,N'-bismaleimides

The N,N'-bismaleimides useful in this invention are well known in the prior art and may be conveniently prepared from maleic anhydride and a diamine as described in U.S. Pat. No. 2,444,536. Briefly, this process comprises reacting maleic anhydride with a primary diamine to yield a bismaleamic acid. This bismaleamic acid formed is then cyclized with acetic anhydride using sodium acetate to yield the desired N,N'-bismaleimide as shown in the following reaction

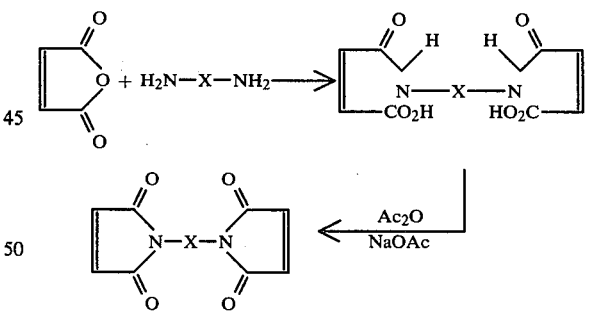

N,N'-Bismaleimides prepared by other processes are also useful in this invention.

The N,N'-bismaleimides useful in this invention may be represented by the formula

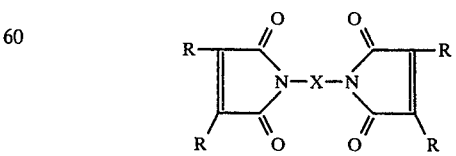

wherein each value of R is independently selected as hereinbefore defined and wherein X is a divalent organic radical, which may be any organic radical, including aliphatic or aromatic hydrocarbon radical, such as alkylene, arylene, alkarylene, aralkylene, and substituted derivatives thereof. A preferred class of bismaleimides of this formula are those where X contains from 1 to 20 carbon atoms. Illustrative examples of X include methylene, ethylene, propylene, butylene, hexamethylene, decamethylene, phenylene, biphenylene, tolylene, ditolylene, xylylene, diphenylmethylene, alkyl substituted diphenylmethylene groups such as tetramethyldiphenylmethylene, diphenylpropylene, diethyldiphenylmethylene, naphthylene groups and alkyl derivatives thereof, methylenedicyclohexylene, anthracenediyl, sulfodiphenylene, oxybis(methylenephenylene), carbonyldiphenylene, oxydiethylene, oxydiphenylene, chlorohexamethylene, tetrachloroparaphenylene, cyclohexylene, and

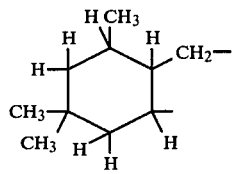

(di-radical from isophorone)

A particularly preferred class of bismaleimides for the preparation of polyimide polymers having the best thermal stability are those bismaleimides wherein X contains an aromatic group. Additional examples of bismaleimides which may be employed in the process of this invention may be found in U.S. Pat. Nos. 2,818,405; 3,625,912; 2,890,207; 2,971,944; 2,890,206; and 3,334,071, the disclosures of which are incorporated herein by reference. Mixtures of bismaleimides may also be used.

The Activated Methylene Compounds

The activated methylene compounds employed in this invention are well known in the prior art and have the general formula $R^1CH_2R^2$, where $R^1$ and $R^2$ as previously defined are the substituents which activate the methylene hydrogens to the extent that reaction can occur at the C—C double bonds of the bismaleimide molecule.

Illustrative examples of the class of activated methylene compounds which react with a bismaleimide to form a polyimide include:

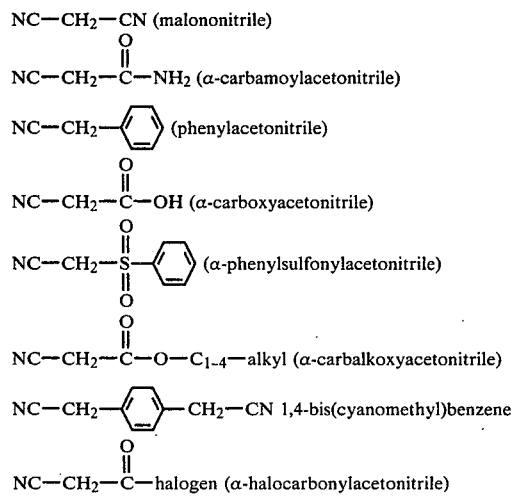

NC—CH$_2$—Cl (α-chloroacetonitrile)
O$_2$N—CH$_2$—C$_{1-4}$—alkyl (nitro alkanes)

$$H_3C-\overset{O}{\underset{\|}{C}}-CH_2-\overset{O}{\underset{\|}{C}}-CH_3 \text{ (acetylacetone)}$$

$$CH_3-CH_2-O-\overset{O}{\underset{\|}{C}}-CH_2-\overset{O}{\underset{\|}{C}}-O-CH_2CH_3 \text{ (diethyl malonate)}$$

$$C_{1-4}-alkyl-O-\overset{O}{\underset{\|}{C}}-CH_2-\overset{O}{\underset{\|}{C}}-O-C_{1-4}-alkyl \text{ (dialkyl acetoacetate)}$$

A preferred class of activated methylene compounds includes malononitrile and α-carbamoylacetonitrile. These compounds react readily with bismaleimides to form polymers having excellent physical properties.

The process of the invention consists of a reaction of an activated methylene compound with an N,N'-bismaleimide. The reaction proceeds to completion in a relatively short period of time at a low polymerization temperature with no catalyst requirement.

The polymerization mechanism is believed to be a hydrogen addition reaction between the activated hydrogens of the methylene compound at the double bonds of the bismaleimide compound in accordance with the following reaction.

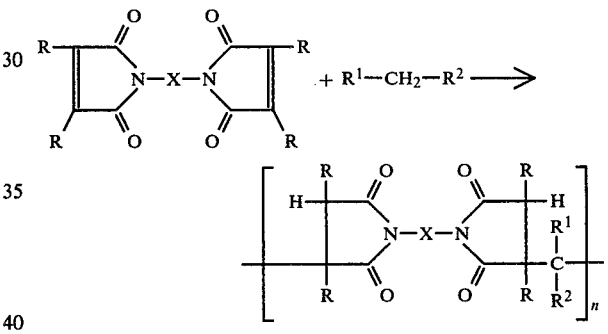

The polymerization reaction can be conducted at a temperature of 0°–170° C., preferably at 10°–120° C. At low temperatures the polymerization rate is slow and at higher temperature the undesirable development of premature gellation is likely to occur. An advantage of this polymerization reaction is that the reaction is accompanied by no side products. No gas or volatile byproducts are evolved in the polymerization reaction nor during the final curing stage when the product polymer is molded under heat and pressure into a useful shaped form containing no voids or blisters.

It has been found that for the polymerization reaction to occur it is necessary to conduct the reaction in a nonreactive organic solvent system. This solvent system must be inert to, but a solvent for, the reactants and polymer species. The solvent can be either a phenol, which is inherently slightly acidic, or can be another nonreactive polar organic solvent which may for optimum results be slightly acidified with an organic or inorganic acid. Although in general, phenols may provide optimum results, due to the greater difficulty in separating phenols from the final product, it may be desirable to select nonphenolic solvents. It is preferred that the amounts of solvent employed be as low as possible. The polymerization reaction can be conducted at solids concentrations of between 1 and 50 weight percentage, and preferably between 10 and 50 weight percentage. Optionally, a catalytic amount of between about 0.2 and 2 weight percent of a weak nitrogenous base such as triethylamine may be added to increase the rate of reaction if desired. Where the solvent is a phenol, it is preferred that the catalyst be used.

The phenolic solvents which may be used include any solvent which may be characterized by the formula

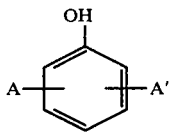

wherein A and A[1] are independently selected from the group consisting of —H, alkyl group having from 1 to 4 carbon atoms, and halogen, particularly bromine and chlorine. Mixtures of compounds having this formula may also be used. Illustrative examples of such solvents include phenol, o-cresol, m-cresol, p-cresol, xylenols, chlorophenols, 2-bromo-4-methylphenol and the like. Preferred solvents are phenol, o-cresol, m-cresol, p-cresol, mixtures of these cresols, 2,6-xylenol, p-chlorophenol, and p-ethylphenol.

Other nonreactive organic polar solvents, such as dimethylformamide, dimethylacetamide, 1methyl-2-pyrrolidone, dimethyl sulfoxide, or cyclohexanone are preferably slightly acidified with an organic acid, such as for example, formic acid, acetic acid, propionic acid, or an inorganic acid, such as sulfuric acid, hydrochloric acid, nitric acid, or phosphoric acid. The concentration of the acid employed in the solvent system, depending on the individual acid used, can range between 1–40 weight percentage and usually, between 5–15 weight percentage of the solvent system.

In a properly acidified nonreactive polar solvent such as acidified dimethylformamide, the polymerization readily results in a gel-free viscous resin from which a film can be cast. If none or insufficient acid is used, the polymerization mixture may gel before a high molecular weight polymer can be produced. If too much acid is employed, the polymerization rate may be undesirably slow or the polymerization will not proceed at all. Where the nonreactive organic solvent is a phenol, it is not necessary to add organic or inorganic acid to control gellation of the polymeric product since the phenol itself is acidic.

The polymerization reaction may frequently benefit by the addition of a catalytic amount of a weak nitrogenous base such as, for example, triethylamine. Other such bases include n-butylamine, isopropylamine, di-n-propylamine, triethylamine, N-methylaniline, aniline, N,N-diethylaniline, ethylenediamine, N,N,N',N'-tetramethylethylenediamine, N,N'-dimethylpiperazine, piperidine, and triethylenediamine. Optionally therefore a catalytic amount of about 0.2 to about 2 weight percent of a weak nitrogenous base, such as triethylamine, may be added to increase the rate of reaction if desired. Where the solvent is a phenol, it is preferred that the catalyst be used.

The polymerization may be conducted in the presence or absence of air.

When the polymerization reaction, carried out either in the phenolic or the nonreactive acidified organic polar solvent system, is complete, the polyimide polymer may be precipitated fom the reaction product to form a polyimide molding powder by mixing the reaction product with a precipitating agent. The precipitating agents used have a boiling point below 150° C. are miscible with the solvent used to prepare the polyimide polymer, and are a non-solvent for the polymide polymer. Illustrative examples of suitable precipitating agents include: water; alkyl alcohols containing from one to six carbon atoms, such as methanol; alkyl ketones containing from three to six carbon atoms; such as methyl ethyl ketone, aromatic hydrocarbons, for example, benzene, toluene, xylene, ethyl benzene, and cumene; saturated cycloaliphtic hydrocarbons; halogenated aliphatic hydrocarbons and halogenated aromatic hydrocarbons, for example, methylene chloride, chloroform, carbon tetrachloride, chlorobenzene, and hexachlorobutadiene; pyridine; and aliphatic carboxylic acids. Preferred precipitating agents are methanol, water, acetone, and methyl ethyl ketone. The amount of precipitating agent used is that amount necessary to completely precipitate the polyimide polymer. The amount of precipitating agent used is about 1 part to 10 parts, and preferably from about 1 part to about 3 parts of precipitating agent per part of solvent used to prepare the polymer. The precipitated polyimide polymer may be isolated from the liquid medium by any suitable means, for example filtration, decantation, or centrifugation. The isolated polyimide polymer is then dried to yield a molding powder.

When activated methylene compounds are polymerized with N,N'-bismaleimides it is not necessary in practice to employ equimolar amounts of the monomers. A reaction mixture of either greater or less than a 1:1 molar ratio of bismaleimide to activated methylene compound may be desirable where the polymer is retained in the polymerization reaction solvent as a viscous solution of suitable viscosity for direct blending with, for instance, Kevlar aramid fiber, glass, boron, or graphite fiber roving, mat or fabric to form a composite, which may further crosslink by curing it under heat and pressure to a useful final cured product having excellent physical properties and heat stability. In this instance, the lower molecular weight polymer provides a product of a viscosity range at the solids concentration usually maintained for the initial polymerization reaction. This viscosity range is also convenient to use in laying up fiber laminates or other resin-fiber composites.

The lower molecular weight polyimide polymers may be either rich in N,N'-bismaleimide component or rich in activated methylene compound component. Both variations yield cured products which have excellent physical properties and thermal properties.

Where the desired useful form of polyimide polymer is a molding powder, it is usually convenient to react the N,N'-bismaleimide with the activated methylene compound in a molar ratio of about 10:4 to 10:8 to achieve a product of suitably high molecular weight, which product is easily isolated in pure powder form, which is dried to give the molding powder. The preferred ratio of N,N'-bismaleimide to activated methylene compounds to obtain high molecular weight product is from about 10:5 to about 10:8. Ratios outside of this range tend to produce lower molecular weight products, which have poor adhesion to fibre reinforcement or higher molecular weight products which have poor molding characteristics under heat and pressure.

The polyimide molding powders of this invention find widespread use in applications wherever high temperature resistant polymers are required. They have high tensile and modular strength and excellent thermal properties, such as heat stability. These materials are easily molded into shaped objects which are useful per se, or which can be machined into other useful objects. Examples of these molded objects would include bearing, grinding wheels, washers, drive shafts, piston rings, wire coatings, and other such molded parts where high thermal stability in addition resistance to chemical corrosion has led to wide acceptance in the automotive, electronic, and aerospace industries, as well as in other industrial applications.

Alternatively, the lower molecular weight polyimide polymers as prepared in solution can be conveniently blended with fibers in the various forms listed above to give laminates which are dried and cured under heat and pressure to give useful composites having excellent physical properties.

Polyimide polymer films may be cast directly from the polymer solution and dried under reduced pressure. The films have exceptionally high tensile strength, high impact resistance, dynamic cut-through strength, superior thermal stability, and excellent chemical and solvent resistances. Those films wherein $R^1$ is —CN, particularly those wherein $R^1$ and $R^2$ are both —CN, can be cured at elevated temperatures to further improve their physical, chemical, and thermal properties. Heat treated films were found to be insoluble in dimethylformamide, whereas untreated films are soluble. Some members of this family of polymers have a glass transition temperature of about 275° C., and as shown in Example 1. These properties make the polymer ideal for use where high strength, high temperature stability, and good corrosion resistance are required. Heat treating or post-curing consists of maintaining the film in an oven in air at about 250° C. for 5–24 hours, at 325° C. for no more than an hour, or for several hours at 250° C. followed by an hour at 325° C. Preferred conditions are 6 hours at 270° C. followed by 1 hour at 325° C.

The following examples are set forth in illustration of the invention unless otherwise indicated, all parts and percentages are by weight. The tensile strength, tensile molulus, and % elongation are determined by test according to ASTM D638 and the flexural strength and flexural modulus by ASTM D799.

EXAMPLE 1

180.1580 g (0.5 mole) of N,N'-(oxydi-p-phenylene)-bismaleimide is dissolved into 650 ml of dimethylformamide in a 2 liter, 3-necked flask. 102.3 ml of glacial acetic acid is then added. The solution is heated to 70° C. and 33.0330 g (0.5 mole) of malononitrile is added to the bismaleimide solution together with another 100.4 ml of dimethylformamide used to wash down the last traces of malononitrile. The entire solution is stirred at 70° C. The polymerization reaction is allowed to continue while maintaining a temperature of 70° C. until the maximum viscosity of the reaction solution is reached, approximately 8¼ hours. Powdered polyimide produce s obtained by precipitating part of the resin solution with stirring into methyl ethyl ketone (MEK), followed by filtering, washing with MEK, and drying. The dried polyimide product is an off-white powder and has a weight average molecular weight of about 40,000 as determined by gel permeation chromatography. Films are cast from the other part of the resin solution, air dried, and then further dried at 70° C. under reduced pressure. The physical properties of the film at room temperature are: tensile strength (T) 13,800 psi, tensile modulus (M) 450,000 psi, and elongation (E) 4.7%. The film is isothermally aged in air at 180° C. and 220° C. The physical properties, measured at 25° C. and elevated temperatures, are as follows:

| Heat Treated Film | Measurement Temperature | Tensile Strength, psi | Tensile Modulus psi | Elongation % |
|---|---|---|---|---|
| 180° C. isothermal aging in air | | | | |
| 1 day | 25° C. | 12,800 | 0.41 × 10⁶ | 4.4 |
| | 200° C. | 6,440 | 0.31 × 10⁶ | 3.3 |
| 3 days | 25° C. | 12,860 | 0.43 × 10⁶ | 3.96 |
| | 200° C. | 7,100 | 0.43 × 10⁶ | 1.90 |
| 7 days | 25° | 11,500 | 0.46 × 10⁶ | 3.48 |
| | 180° C. | 6,000 | 0.43 × 10⁶ | 1.49 |
| 220° C. isothermal aging in air | | | | |
| 1 day | 25° C. | 5,600 | 0.41 × 10⁶ | 1.42 |
| | 200° C. | 2,700 | 0.34 × 10⁶ | 0.87 |
| 3 days | 25° C. | 6,300 | 0.42 × 10⁶ | 1.7 |
| | 200° C. | 2,900 | 0.36 × 10⁶ | 0.84 |
| 7 days | 25° C. | 8,800 | 0.43 × 10⁶ | 2.47 |
| | 220° C. | 6,000 | 0.36 × 10⁶ | 1.78 |

Thermogravimetric analysis (TGA) spectra indicate that the polyimide does not degrade below 285 C. and differential thermal analysis (DTA) shows the polyimide has a glass transition temperature at 275° C. as determined on a DuPont Differential Thermal Analyzer, Model 900, at a heating rate of 10° C. per minute. This is also corroborated by tensile measurements versus temperature. Heat treated films are found to be insoluble in DMF, whereas the untreated films are soluble.

EXAMPLE 2

162.1422 g (0.45 mole) of N,N'-(oxydi-p-phenylene)-bismaleimide is dissolved in 700 ml. of o-cresol in a 2 liter, 3-necked flask. 29.7270 g of malononitrile is added with another 67.5 ml of o-cresol to the bismaleimide solution. The solution is thoroughly stirred and 2.65 ml of triethylamine is added at ambient temperature. The polymerization reaction is allowed to continue at ambient temperature until the maximum viscosity of the reaction solution is reached, approximately 10–22 hours. Then 3.8 g of N,N'-(oxydi-p-phenylene)-bismaleimide in 767.5 ml. of o-cresol is added to the viscous polymer solution. The whole mixture is stirred at ambient temperature for 24 hours. The resulting polymer solution is then precipitated into stirred methyl ethyl ketone and the precipitated polymer powder isolated, washed with methyl ethyl ketone, and dried.

The dried polyimide powder is dissolved in dimethylformamide and films cast from the resulting solution, air dried, and then further dried at 50° C. under reduced pressure. The physical properties of the film at room temperature are tensile strength (T) 12,600 psi, tensile modulus (Mi) 390,000 psi, and elongation (E) 6.36%. The film is isothermally aged in air at 180° C. The physical properties measured at 25° C. and elevated temperatures are as follows:

| Heat Treated Film | Measurement Temperature | Tensile Strength (psi) | Tensile Modulus (psi) | Elongation (%) |
|---|---|---|---|---|
| 180° C. isothermal aging in air | | | | |
| 1 day | 25° C. | 10,800 | 0.40 × 10⁶ | 3.05 |
| | 180° C. | 7,000 | 0.25 × 10⁶ | 3.12 |
| | 200° C. | 6,200 | 0.26 × 10⁶ | 2.75 |

-continued

| Heat Treated Film | Measurement Temperature | Tensile Strength (psi) | Tensile Modulus (psi) | Elongation (%) |
|---|---|---|---|---|
| 3 days | 25° C. | 10,600 | $0.41 \times 10^6$ | 2.79 |
| | 180° C. | 4,500 | $0.25 \times 10^6$ | 1.88 |
| | 200° C. | 5,700 | $0.26 \times 10^6$ | 2.30 |

EXAMPLE 3

179.1710 g. (0.5 mole) of N,N'-(methylenedi-p-phenylene)bismaleimide is dissolved in 650 ml. of dimethylformamide and 108.85 ml of glacial acetic acid. 33.0330 g. of malononitrile is then added to the bismaleimide solution with another 97 ml. of dimethylformamide. The solution is then heated to 70° C. with stirring. The polymerization reaction is allowed to continue while maintaining the reaction solution at a temperature of 70° C. until the maximum viscosity of the reaction solution is reached, approximately 42 hours. Powdered polyimide is obtained by precipitating part of the resin solution with stirring into methyl ethyl ketone, followed by filtering, washing with methyl ethyl ketone, and drying. Films are cast from the other part of the resin solution, air dried, and then further dried at 50° C. under reduced pressure. The physical properties of the film at room temperature are: tensile strength (T) 12,100 psi, tensile modulus (Mi) 410,000 psi, and elongation 4.7%. The film is then isothermally aged in air at 180° C. and 220° C. and the physical properties measured at 25° C. are as follows:

| Heat Treated film | Tensile Strength psi | Tensile psi | Elongation % |
|---|---|---|---|
| 180° C. isothermal aging in air | | | |
| 1 day | 7,000 | $0.39 \times 10^6$ | 2,1 |
| 3 days | 6,200 | $0.40 \times 10^6$ | 1.7 |
| 220° C. isothermal aging in air | | | |
| 1 day | 4,200 | $0.39 \times 10^6$ | 1.1 |
| 3 days | 5,400 | $0.41 \times 10^6$ | 1.5 |

EXAMPLES 4-6

Examples 4, 5, and 6 show the copolymerization of malononitrile with various other bismaleimides. The ingredients and the reaction conditions of the polymer formulations are shown in Table I. The procedure employed is as follows: into a three-necked flask is placed the specified bismaleimide and the indicated solvent. Equivalent amounts of malononitrile are then added to the bismaleimide solutions. The amounts of weak nitrogenous base, where indicated, are then added. The polymerization reactions are allowed to continue under the indicated polymerization conditions. At the end of polymerization the polymer solutions (20%) are precipitated by stirring into methyl ethyl ketone to give the polymer powder in each case.

TABLE I where X in the following formula is $$\text{N-X-N with two maleimide rings}$$

| Example Number | X | Grams of Bismaleimides | Grams of Malononitrile | Solvent and Amount of Solvent | Nitrogeneous base and Amount | Polymerization Conditions |
|---|---|---|---|---|---|---|
| 4 | –⟨⟩–S(O)₂–⟨⟩– | 40.8 | 6.07 | o-cresol 190 ml | triethylamine 0.48g | 2.5 hrs. at 70° C. |
| 5 | –⟨⟩– | 13.4 | 3.3 | dimethylformamide 67 ml | none | 2 hrs at 25° C. |
| 6 | —CH₂CH₂— | 22.0 | 6.6 | o-cresol 115 ml | triethylamine 0.29 g | 40 hrs. at 50° C. |

TABLE II

| A | B | C | D | E | F | G | H |
|---|---|---|---|---|---|---|---|
| 7 | NCCH₂C(O)NH₂ | 8.4 | –⟨⟩–O–⟨⟩– | 36.03 | ⟨⟩–OH (Me) 180 ml | Et₃N 0.48g | 65° C., 17 hrs. |
| 8 | NCCH₂C(O)NH₂ | 2.1 | –⟨⟩–CH₂–⟨⟩– | 8.96 | HCONMe₂ 44 ml. | Et₃N 0.11g | 60° C., 12 hrs. |
| 9 | NCCH₂–⟨⟩ | 2.93 | –⟨⟩–O–⟨⟩– | 9.01 | HCONMe₂ 48 ml | Et₃N 0.11g. | 50° C., 6 hrs. |
| 10 | NCCH₂S(O)₂–⟨⟩ | 2.73 | –⟨⟩–O–⟨⟩– | 5.40 | HCONME 30 ml CH₃CO₂H 2.6 ml | none | 50° C., 6 hrs. |
| 11 | NCCH₂C(O)—OEt | 5.66 | –⟨⟩–O–⟨⟩– | 18.02 | HCONMe₂ 95 ml | none | 25° C., 1 min. |

TABLE II-continued

| A | B | C | D | E | F | G | H |
|---|---|---|---|---|---|---|---|
| 12 | NCCH$_2$CO$_2$H | 2.13 | —C$_6$H$_4$—CH$_2$—C$_6$H$_4$— | 8.99 | N-methylpyrrolidone 44 ml. | Et$_3$N 0.11g | 80° C., 4 hrs. |
| 13 | NCCH$_2$Cl | 1.89 | —C$_6$H$_4$—CH$_2$—C$_6$H$_4$— | 8.96 | N-methylpyrrolidone 44 ml. | Et$_3$N 0.11g. | 100° C., 39 hrs. |
| 14 | O$_2$NCH$_2$CH$_3$ | 1.88 | —C$_6$H$_4$—O—C$_6$H$_4$— | 9.01 | HCONMe$_2$ 44 ml | Et$_3$N 0.02g. | 50° C., 2.5 hrs. |
| 15 | MeCOCH$_2$COMe | 10.01 | —C$_6$H$_4$—CH$_2$—C$_6$H$_4$— | 35.83 | HCONMe$_2$ 234 ml; PhOH 26 ml | Et$_3$N 0.18g. | 25° C., 7.5 hrs. |
| 16 | MeCOCH$_2$COMe | 9.01 | —C$_6$H$_4$—O—C$_6$H$_4$— | 32.43 | HCONMe$_2$ 211.3; PhOH 23.5 ml | Et$_3$N 0.17g. | 25° C., 29 hrs. |
| 17 | MeCCH$_2$CMe (O,O) | 8.01 | —C$_6$H$_4$—SO$_2$—C$_6$H$_4$— | 32.67 | NCONMe$_2$ 207.5 ml; PhOH 23 ml. | Et$_3$N 0.16g. | 25° C., 35 hrs. |

A = Example Number
B = Activated Methylene Compound
C = Grams of Activated Methylene Compound
D = represents X in the formula

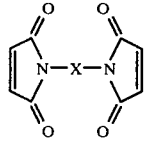

E = Grams of Bismaleimide
F = Solvent and Amount of Solvent
G = Nitrogeneous Base and Amount Of Base
H = Polymerization Conditions

EXAMPLES 7–17

Examples 7 through 17 show the copolymerization of other activated methylene compounds with various bismaleimides. The ingredient and the reaction conditions of the polymer formulations are shown in Table II. The procedure employed is as follows: into a three-necked flask is placed the bismaleimide and the solvent as indicated. Equivalent amounts of the indicated activated methylene compound are then added to the bismaleimide solutions. The amounts of catalyst, where indicated, are then added. The polymerization reactions are allowed to continue under the indicated polymerizations conditions. The formation of polymer is observed in each case.

EXAMPLE 18

17.9136 g (0.05 mole) of N,N'-(methylenedi-p-phenylene)-bismaleimide is dissolved in 80 ml of cresol (N.F.) in a 500 ml. 3-necked flask. 8.0085 g (0.05 mole) of diethyl malonate in 34 ml. of cresol is then added. The solution is stirred 4 hrs. at ambient temperature with no increase in the solution viscosity after 4 hrs. The solution is then heated to 150° C. and stirred at 150° C. for 7 hrs. The solution becomes viscous and the polymer is precipitated into acetone.

EXAMPLE 19

36.0316 g (0.1 mole) of N,N'-(oxydi-p-phenylene)-bismaleimide is dissolved in 128.4 ml of dimethylformamide in a 500 ml, 3-necked flask. 18.9 ml of glacial acetic acid is then added. The solution is heated to 70° C. and 3.3 g (0.05 mole) of malononitrile is added to the bismaleimide solution together with another 10 ml. of dimethylformamide. The entire solution is stirred at 70° C. for 8 hrs. At the end of the reaction the solution is poured into stirred methanol. This low molecular weight prepolymer is isolated by filtration, washed with methanol and dried. The off-white prepolymer powder has a softening point of 220° C., starts to melt at about 235° C., and gels at 285° C. The prepolymer powder can be molded with 60% chopped glass fiber into a tough molding under molding conditions of 275° C., 2000 psi for 10 minutes.

EXAMPLE 20

288.2528 g (0.8 mole) of N,N'-(oxydi-p-phenylene)-bismaleimide are dissolved in 1 l. of dimethylformamide in a 3-l, 3-necked flask, 164 ml of glacial acetic acid is then added. The solution is heated to 70° C. 52.8528 g. (0.8 mole) of malononitrile is added to the bismaleimide solution together with another 200.6 ml of dimethylformamide, used to wash down the last traces of malononitrile. The entire solution is stirred at 70° C. The polymerization reaction is allowed to continue while maintaining a temperature of 70° C. until a maximum viscosity, 7.9 poise, as measured with ICI Cone Plate viscometer, is reached, approximately 10.5 hrs. Powdered polyimide is obtained by precipitating part of the resin solution with stirring into methanol, followed by filtering, washing with methanol, and drying. The dried polyimide is an off-white powder and has an average mol. wt. of about 100,000 as determined by gel permeation chromatography.

Films are cast directly from the other part of the resin solution, air dired, and then further dired at 70° C. under reduced pressure in a vacuum oven.

For the purpose of evaluating the polyimide resin as a high temperature wire coating resin, the dynamic cut-through strength of the film is evaluated. The test measures the ability of a coating to resist the penetration of a sharp edge. In this test, the 2 mil-thick film specimen is placed on a flat metal surface, and a circular metal tool which has a 5-mil flat wedge is used as a cutting knife. An Instron Universal tester, operating in the compression mode, is used to force the knife edge into the film at a constant rate of 0.2 inch per minute. When the tool cuts through the film and contacts flat metal surface the test is stopped. Since test results vary, depending on the individual cutting tool used, illustrative comparative tests against a commercially available film are run as a standard. The Kapton 200 H polyimide film is commercially available from the E. I. duPont deNemours and Co.

| Measurement Temp, °C. | Ex. 20 Film Load Lbs. | Kapton 200H Polyimide Film Load Lbs. |
| --- | --- | --- |
| 25 | 138.9 | 107.2 |
| 100 | 148.3 | 85.5 |
| 150 | 92.7 | 69.1 |
| 180 | 85 | 74.5 |
| 200 | 74.3 | 64.7 |
| 250 | 69 | 63.6 |

The tensile properties of the film are measured:

| Film | Measurement Temperature °C. | Tensile Strength psi | Tensile Modulus psi | % Elongation |
| --- | --- | --- | --- | --- |
| Original Film | 25 | 13,800 | $0.45 \times 10^6$ | 4.7 |
|  | 200 | 4,900 | $0.27 \times 10^6$ | 17.28 |
| Postcured Film | 25 | 10,100 | $0.44 \times 10^6$ | 3.07 |
|  | 200 | 8,200 | $0.36 \times 10^6$ | 2.45 |
|  | 220 | 8,300 | $0.36 \times 10^6$ | 2.60 |
|  | 250 | 8,300 | $0.40 \times 10^6$ | 2.43 |
|  | 270 | 7,700 | $0.35 \times 10^6$ | 2.63 |

Postcuring of the film consists of holding the film in an oven 6 hrs. at 270° C. followed by 1 hr at 325° C. Alternatively, the film may be held 5–24 hours in the oven at 250° C., or for an hour at 325° C.

The long term thermal stability of the film is as follows:

| Original film isothermally aged in air at 180° C. | Measurement Temperature °C. | Tensile Strength psi | Tensile Modulus psi | Elongation % |
| --- | --- | --- | --- | --- |
| 0 | 25 | 13,800 | $0.45 \times 10^6$ | 4.70 |
| 0 | 200 | 4,900 | $0.27 \times 10^6$ | 17.60 |
| 1 day | 25 | 12,800 | $0.41 \times 10^6$ | 4.4 |
| 1 day | 200 | 6,400 | $0.31 \times 10^6$ | 3.3 |
| 3 days | 25 | 12,860 | $0.43 \times 10^6$ | 3.96 |
| 3 days | 200 | 7,050 | $0.43 \times 10^6$ | 1.90 |
| 1 week | 25 | 11,500 | $0.46 \times 10^6$ | 3.48 |
| 1 week | 180 | 6,000 | $0.43 \times 10^6$ | 1.49 |
| 3 weeks | 25 | 14,200 | $0.47 \times 10^6$ | 4.26 |
| 3 weeks | 180 | 5,000 | $0.39 \times 10^6$ | 1.32 |
| 6 weeks | 25 | 12,250 | $0.40 \times 10^6$ | 4.49 |
| 6 weeks | 180 | 3,700 | $0.36 \times 10^6$ | 1.09 |
| 10 weeks | 25 | 10,600 | $0.40 \times 10^6$ | 3.71 |
| 10 weeks | 180 | 5,100 | $0.37 \times 10^6$ | 1.40 |
| 15 weeks | 25 | 12,000 | $0.49 \times 10^6$ | 3.86 |
| 15 weeks | 180 | 10,500 | $0.75 \times 10^6$ | 1.51 |
| 20 weeks | 25 | 12,350 | $0.46 \times 10^6$ | 4.62 |
| 20 weeks | 180 | 4,800 | $0.39 \times 10^6$ | 1.27 |

Other physical properties of the film measured are specific gravity 1.22, glass transition temperature 275° C., limited oxygen index number (LOI) 22.7% (2 ml. film), and smoke density $Ds_{1.5}=0$, $Ds_4=1$, and $Dm=5$, as determined in an NBS smoke chamber flaming test.

The chemical and solvent resistance of the film is measured by immersing the film in the test material 30 weeks at ambient temperature. The film is unaffected by m-cresol, chlorobenzene, water, tetrachloroethane, 10% sulfuric acid, 10% hydrochloric acid, 10% sodium chloride, and glacial acetic acid. The film is swelled by acetone and dioxane. The film surface cracks in methyl ethyl ketone. The film disintigrates in cyclohexanone and in concentrated hydrochloric acid. The film dissolves in dimethylformamide, dimethylacetamide, N-methyl-pyrrolidone, dimethyl sulfoxide, concentrated sulfuric acid, and in 10% sodium hydroxide.

EXAMPLE 21

1433.4 g (4.0 moles) of N,N'-(methylenedi-p-phenylene) bismaleimide and 1800 ml. of dimethylformamide are placed in a 5-liter 3-necked flash and heated to 70° C. When the solution is complete, 257.7 ml. of glacial acetic acid is added followed by 185 g. (2.8 moles) of malononitrile which is washed into the flask with 87.9 ml. of dimethylformamide. A brief exotherm to 98° C. occurs. The solution is stirred at about 70° C. for 12.5 hours, at which time the viscosity has reached about 6.0 poise as determined by ICI cone Plate viscometer. The polymer solution is then cooled overnight.

12×24 inch pieces of woven glass fabric are then impregnated with the resin solution which has 43% solid contents to make 65:35% by weight glass-resin laminates, the laminates are air dried overnight, then dried at 80° C. in vacuum, and 6×6 inch squares of the laminate molded at 225°–230° C. and 2765 psi for 10 minutes. The physical properties of the laminates are then determined.

| Temp. °C. | Flexural Strength psi | Flexural Modulus psi × 10^6 | Tensile Strength psi | Barcol Hardness | Compressive Strength psi | Impact Strength Notched Izod |
| --- | --- | --- | --- | --- | --- | --- |
| 25° | 81800 | 3.91 | 47900 | 75–81 | 69720 | 15.8 |
| 200° | 72600 | 3.16 | 42600 | 64–72 | — | — |
| 270 | 49800 | 2.43 | 41800 | 50–58 | — | — |

The heat distortion temperature (ASTM D648) of the laminate is above 260° C., the limiting oxygen index (LOI) (ASTM D2863) is 75.9, the smoke density (NBS Chamber) is $Ds_{1.5}=0$, $Ds_4=4$, $Dm=12$, specific gravity is 1.87, coefficient of linear expansion (ASTM D696) (in./in./°C.) is $14\times10^{-6}$, water absorption (ASTM 570) (24 hrs.) is 0.344%, at (23 weeks) is 1.82%, dielectric strength (volts/mil) is above 489, dielectric constant (ASTM D150) at $10^7$ Hz is 5.004, at $10^6$ Hz is 4.987, at $5\times10^4$ Hz is 5.109, dissipation factor at $10^7$ Hz is 0.0081, at $10^6$ Hz is 0.00779, at $5\times10^4$ is Hz 0.00735, surface resistivity (ASTM D257) is $2.85\times10^{15}$ ohms-square, volume resistivity $2.34\times10^{15}$ (ASTM D257) ohms-inches, and arc resistance (ASTM D495) is 181 seconds.

The chemical and solvent resistance of the laminate is measured by the retention of flexural strength of the laminate after exposure 7 days at 25° C. to the solvent or chemical. The flexural strength is unaffected in 50% acetic acid, 10% sulfuric acid, acetone, carbon tetrachloride, dimethylformamide, toluene, heptane, methanol, dioxane, and dichlorobenzene. 93% of the original flexural strength is retained in 10% nitric acid, 60% in 10% aqueous ammonia, and 68% in boiling water.

Although this invention has been described with reference to specific bismaleimides, activated methylene compounds, solvents, catalysts, and process conditions, it will be appreciated that other process conditions, including monomer concentrations, temperature and reaction time, and other bismaleimides, activated methylene compounds, solvents, and catalysts may be employed in place of those specifically described above without departing from the spirit of the present invention.

What is claimed is:

1. A polyimide polymer suitable for forming a film, a molding powder or a laminate characterized by the formula:

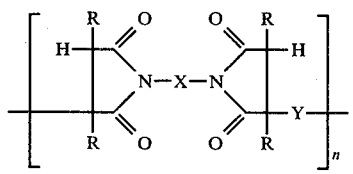

wherein X is a divalent organic radical;
wherein each R is independently selected from the group consisting of —H, —F, —Cl, —Br, —CF$_3$, and C$_{1-4}$ alkyl;
wherein Y is

wherein R$^1$ is a monovalent radical selected from the group consisting of —CN, —NO$_2$,

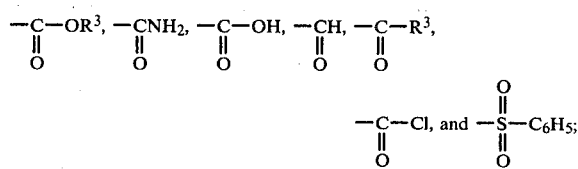

wherein R$^3$ is C$_{1-4}$ alkyl;
wherein R$^2$ is a monovalent radical selected from the group consisting of —CN, —NO$_2$,

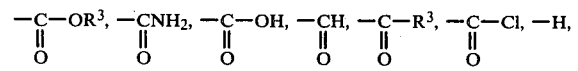

—CH$_3$, —C$_6$H$_5$, —Cl, —F, and —C$_6$H$_4$Z;
wherein Z is selected from the group consisting of —H, —CH$_3$, a lower alkyl, —Cl, —Br, and —F; and
wherein n is an integer.

2. A polymer of claim 1 wherein X is selected from the group consisting of phenylene, alkylene, and —C$_6$H$_4$—Q—C$_6$H$_4$—; and wherein Q is selected from the group consisting of —CH$_2$—, —O—, —SO$_2$—, and —CO—.

3. A polymer of claim 2, wherein R$^1$ of Y is selected from the group consisting of —CN and

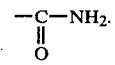

4. A polymer of claim 2, wherein X is p,p'-C$_6$H$_4$—Q—C$_6$H$_4$—; wherein
Q is selected from the group consisting of —CH$_2$— and —O—; and wherein
R$^1$ is —CN, and
R$^2$ is selected from the group consisting of —CN and

* * * * *